United States Patent [19]

Nakane et al.

[11] Patent Number: 5,039,760
[45] Date of Patent: Aug. 13, 1991

[54] POLYESTER RESIN COMPOSITION

[75] Inventors: Toshio Nakane; Michiro Naka; Yukihiko Kageyama; Hiroaki Konuma; Kenji Hijikata, all of Shizuoka, Japan

[73] Assignee: Polyplastics Co., Ltd., Osaka, Japan

[21] Appl. No.: 473,664

[22] Filed: Feb. 2, 1990

[30] Foreign Application Priority Data

Feb. 7, 1989 [JP] Japan ................................ 1-27831

[51] Int. Cl.⁵ .............................................. C08L 67/02
[52] U.S. Cl. ..................................... 525/448; 525/437
[58] Field of Search ................................ 525/437, 448

[56] References Cited

U.S. PATENT DOCUMENTS 3,673,139  6/1972  Hrach ..................................... 525/177
3,959,215  5/1976  Schneider ............................. 525/437

Primary Examiner—Patricia Short
Attorney, Agent, or Firm—Nixon & Vanderhye

[57] ABSTRACT

A polyester resin composition exhibiting improved heat-resistant flexibility including (A) a polyester copolymer which is the polycondensation reaction product of (a) an aromatic dicarboxylic acid or an ester-forming derivative thereof, (b) an aliphatic glycol, and (c) between 0.001 to 1.0 mole %, based upon component (a), of a branch-forming compound, and (B) between 0.1 to 10% by weight (based on the total weight of the composition) of a bisoxazoline compound.

5 Claims, No Drawings

POLYESTER RESIN COMPOSITION

FIELD OF INVENTION

The present invention generally relates to polyester resin compositions useful as general industrial materials. More particularly, the invention relates to polyester resin compositions which comprise a polyester copolymer having a branched or crosslinked structure, and a bisoxazoline compound. The compositions of this invention exhibit excellent heat resistance properties and do not lose their flexibility even when subjected to repeated cycles of low/high temperature conditions (referred to below as "thermal history conditions").

BACKGROUND AND SUMMARY OF THE INVENTION

Polyalkylene terephthalate resins, such as polyethylene terephthalate or polybutylene terephthalate, have conventionally been used in applications requiring heat resistance. Moreover, polyalkylene terephthalate exhibits excellent mechanical and electrical properties, in addition to favorable processing characteristics. As such, polyalkylene terephthalate resins have been used in a number of diverse fields. Recently, however, the service and end-use environments for polyalkylene terephthalate resins have become more severe thereby creating a need for polyalkylene terephthalate resins of improved properties and/or performance characteristics.

Although polyalkylene terephthalate resins are considered to be "crystalline" resins, they nonetheless include a minor amount of non-crystalline regions. During use, particularly when the polyalkylene terephthalate is subjected to cyclical thermal history conditions (i.e. repeated cycles of high and low temperatures), the non-crystalline regions will crystallize. This crystallization will thereby change the resin's density and will, moreover, give rise to internal stress causing chain cleavage. Thus, the resin's mechanical properties, such as flexibility and impact resistance, are deleteriously reduced. For these reasons, the use of such resins in environments where the flexibility of the resin is important and where the resin is subject to repeated high/low temperature conditions, has been limited due to the adverse affect upon the resin's mechanical properties (i.e. flexibility) that such an environment could cause.

Attempts have been made to lower the crystallinity of polyester resin by the addition of an elastomer so as to address the above problem. However, polyester resin compositions containing an elastomer are disadvantageous in that long-term thermal history conditions cannot be tolerated — presumably due to the crystalline matrix remaining in the resin. In addition, lower mechanical characteristics (such as abrasion resistance) are exhibited due to the reduced crystallinity of the resin, even though the addition of the elastomer gives some improvement.

What has been needed therefore is a polyalkylene terephthalate resin (e.g. a polyester) that does not lose its flexibility even when subjected to thermal history conditions and thus retains its excellent mechanical and electrical characteristics. It is towards attaining such a resin that the present invention is affected.

Broadly, the present invention is directed to resin compositions comprising an aromatic polyester copolymer having a branched or crosslinked structure and a specific compound (to be described below) that satisfies the above-noted requirements. More specifically, the present invention relates to polyester resin compositions which retain their flexibility even when subjected to cyclic thermal conditions, and comprise, (A) a polyester copolymer prepared by the polycondensation of (a) an aromatic dicarboxylic acid or an ester-forming derivative thereof with (b) an aliphatic glycol and (c) a branch-forming compound wherein said branch-forming compound (c) is contained in an amount of 0.001 to 1.0 mole % based on the component (a), and (B) 0.1 to 10% by weight (based on the total weight of the composition) of a bisoxazoline compound.

Until the present invention, it has been very difficult to provide a polyester resin composition that simultaneously exhibits a number of desirable characteristics, for example, abrasion resistance and flexibility (flexing properties and elongation), together with an ability to retain its initial high elongation and flexing properties for prolonged time periods in heated atmospheres. Accordingly, it is unexpected that compositions comprising a polyalkylene terephthalate containing a branched or crosslinked structure, and a bisoxazoline compound (within a specified ratio) according to the present invention do not lose their flexibility even when subjected to thermal history conditions and, in addition, exhibit significantly improved long-term stability in heated atmospheres.

DETAILED DESCRIPTION OF THE PREFERRED EMBODIMENTS

The compositions of the present invention necessarily comprise between 90 to 99.9 wt % of a polyester copolymer which will be described in greater detail below.

The polyester copolymer used in the present invention is the polycondensation reaction product of (a) an aromatic dicarboxylic acid or an ester-forming derivative thereof (b) an aliphatic glycol and (c) a branch forming compound. Representative examples of component (a) include terephthalic acid and derivatives thereof. If necessary, component (a) may contain, as an auxiliary component, a dicarboxylic acid such as isophthalic, naphthalenedicarboxylic or tetrabromoterephthalic acid or a derivative thereof; a fatty acid such as adipic, sebacic or succinic acid or an ester-forming derivative thereof; or an aromatic hydroxy carboxylic acid such as hydroxybenzoic or hydroxynaphthoic acid or an ester-forming derivative thereof.

The aliphatic glycol (b) used to form the polyester copolymer of the present invention preferably mainly comprises an aliphatic diol. Representative examples thereof include C2 to C8 low-molecular weight glycols such as ethylene glycol, 1,4-butylene glycol, 1,3-propanediol, 1,4-butenediol, 1,6-hexanediol and 1,8-octanediol. Furthermore, the aliphatic glycol component (b) may contain, as an auxiliary component, (i) a high-molecular weight glycol, for example, polyalkylene oxide glycol such as polyethylene oxide glycol or pollybutylene oxide glycol, or (ii) an alkylene oxide adduct of alcohol or an ester-forming derivative thereof. Examples of such adducts include adducts of bisphenol A with 2 mol. of etylene oxide or propylene oxide, adducts of tetrabromobisphenol A with 2 mol. of ethylene oxide or propylene oxide, adducts of tetrabromobisphenol sulfone with 2 mol. of ethylene oxide or propylene oxide and adduct of tetrabromohydroquinone with 2 mol. of ethylene oxide.

The branch-forming compound (c) used to form the polyester copolymer (A), according to the present invention is a compound having at least three functional groups, in sum total, which may be the same or different from each other selected from among carboxyl and hydroxyl groups and ester-forming derivative groups thereof in its molecule.

Examples of the compound (c) having groups selected from carboxyl groups and its derivative groups include trimesic, trimellitic, pyromellitic, mellitic, butanetricarboxylic and buteneytricarboxylic acids and alkyl esters thereof; acid anhydrides such as trimellitic anhydride; glycerol, trimethylolpropane, trimethylolhexane, pentaerythritol, depentaerythritol, 1,3,5-trimethylolbenzene, 1,3,5-triethylolbenzene and 2,2,6,6-tetramethylolcyclohexanol and esters thereof with lower carboxylic acids; and hydroxy carboxylic acid such as 5-hydroxyisophthalic acid and derivatives thereof.

Among them, trialkyl trimesates, trialkyl trimellitates, tetraalkyl pyromellitates and pentaerythriol are preferred.

According to the present invention, a branched structure is introduced into a polyester in a suitable degree by using a branch-forming compound (c) as described above in a specified amount as the constituent to be copolymerized.

When the branched structure is introduced into the polyester in too high a degree, the resulting polymer becomes brittle due to the three-dimensional network formed therein thereby resulting in gelation. On the other hand, when the branched structure is introduced by the addition of a specified amount of the component (c) according to the present invention, the resulting polymer has excellent flexibility, in spite of the presence of the branched structure. More specifically, the resin can retain its inherent strength and flexibility by virtue of the synergistic interlocking effect of the branched structure and the presence of the component (B), even if some negligible chain cleavage caused by long-term thermal history conditions occurs.

According to the present invention, the branch-forming compound (c) is copolymerized in such an amount that its content is between 0.01 to 1.0 mole %, preferably between 0.001 to 0.4 mole %, based on component (a). If the content of component (c) is less than 0.001 mole %, insufficient flexibility retention after thermal history conditions. However, if it exceeds 1.0 mole %, the resulting polyester will exhibit too high a melt viscosity and/or will be insoluble or infusible due to the excessive three-dimensional structure that is formed, thereby resulting in poor processability.

The copolymer to be used in the present invention may be prepared by conventional processing techniques such as melt polymerization, and may have an intrinsic viscosity of between about 0.5 to 3.0, preferably at least 0.8, and still preferably at least 1.0.

The bisoxazoline compound (B) that may be used in the present invention is one represented by the following general formula (1):

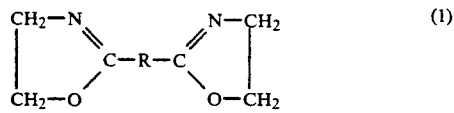

wherein R is a divalent organic group and the hydrogen atoms may be each replaced by an alkyl or aryl group.

Examples of the bisoxazoline compound (B) represented by the general formula (1) include 2,2'-methylenebis(2-oxazoline), 2,2'-ethylenebis-(2-oxazoline), 2,2'-ethylenebis(4-methyl-2-oxazoline), 2,2'-propylenebis(2-oxazoline), 2,2'-tetramethylenebis-(2-oxazoline), 2,2'-hexamethylenebis(2-oxazoline), 2,2'-octamethylenebis(2-oxazoline), 2,2'-p-phenylenebis(2-oxazoline), 2.2'-p-phenylenebis(4-methyl-2-oxazoline), 2,2'-p-phenylenebis(4,4-dimethyl-2-oxazoline), 2,2'-p-phenylenebis(4-phenyl-2-oxazoline), 2,2'-m-phenylenebis(2-oxazoline), 2,2'-m-phenylenebis(4-methyl-2-oxazoline), 2,2'-m-phenylenebis(4,4-dimethyl-2-oxazoline), 2,2'-m-phenylenebis(4-phenyl-2-oxazoline), 2,2'-o-phenylenebis(2-oxazoline), 2,2'-phenylenebis(4-methyl-2-oxazoline), 2,2'-bis(2-oxazoline), 2,2'-bis(4-methyl-2-oxazoline), 2,2'-bis(4-ethyl-2-oxazoline) and 2,2'-bis(4-phenyl-2-oxazoline). These bisoxazoline compounds may be used alone or as a mixture of two or more of the same.

It is preferable to use a bisoxazoline compound represented by the general formula (1) wherein R is an aromatic ring group, and most preferably wherein R is a phenylene group. Particularly, 2,2'-m-penylenebis(2-oxazoline) and 2,2'-p-phenylenebis(2-oxazoline) are preferred.

The amount of the bisoxazoline compound (B) to be added is between 0.1 to 10% by weight, preferably between 0.1 to 5% by weight based on the total weight of the composition. If the amount of bisoxazoline compound used is too small, the beneficial effect will not be exhibited, while if it is present in too large a quantity, a number of problems (such as rapid viscosity increase and/or an increase in the amount of decomposition products) will occur.

According to the present invention, the amount of the bisoxazoline compound (B) to be used is limited as described above, so that the resulting composition is significantly improved with respect to flexibility under heat, without increasing the intrinsic viscosity, i.e., lowering its flowability during molding.

The bisoxazoline compound (B) may be added either in the step of preparing the aromatic copolyester, or in the step of pelletizing the resin composition.

The resin composition of the present invention may optionally contain a small amount of other thermoplastic resins provided that the effects realized by the present invention are not altered significantly. The optional thermoplastic resin may be any resin which is stable at high temperatures, examples thereof including polyesters other than the component (A), polyamide, polycarbonate, ABS, polyphenylene oxide, polyalkyl acrylate, polyacetal, polysulfone, polyether sulfone, polyether imide, polyether ketone and fluororesins. These thermoplastic resins may also be used as a mixture of two or more of the same.

Although the resin compositions of the present invention exhibit excellent performance, even in the absence of performance-enhancing additives, the resin compositions of this invention may contain such additives if desired. Examples of additives that may optionally be employed in the resin compositions of this invention include stabilizers, such as antioxidants and ultraviolet absorbers, antistatic agents, flame retardants, auxiliary flame retardants, coloring agents such as dyes and pigments, lubricating agents for improving the resin's flowability and mold release properties, lubricants, crystallization accelerators (nucleating agents), and inorganic filler materials. Particularly, the addition of an antioxidant is favorable since it further improves the heat stability of the resin. Preferred antioxidant stabilizers include hindered phenols, amines and phosphorus compounds.

Examples of hindered phenol stabilizers include 2,2'-methylenebis(4-methyl-6-t-butylphenol), hexamethylene glycol bis(3,5-di-t-butyl-4-hydroxyhydrocinnamate), tetrakis[methylene(3,5-di-t-butyl-4-hydroxyhydrocinnamate)]methane, triethylene glycol bis-3-(3-t-butyl-4-hydroxy-5-methylphenyl) propionate, 1,3,5-trimethyl-2,4,6-tris(3,5-di-t-butyl-4-hydroxy benzyl)-benzene, n-octadecyl 3-(4'-hydroxy-3',5'-dit-butylphenol)propionate, 4,4'-methylenebis(2,6-di-t-butylphenol), 4,4'-butylidenebis-(6-t-butyl-3-methylphenol), 2,2'-thiodientylbis[3-(3,5-di-t-butyl-4-hydroxyphenyl)-propionate, distearyl3,5-di-t-butyl-4-hydroxybenzylphosphonate and 2-t-butyl-6-(3-t-butyl-5-methyl-s-hydroxybenzyl)-4-methylphenyl acrylate. These compounds may be used alone or as a mixture of two or more of them. Among them, hexamethylene glycol bis(3,5-di-t-butyl-4-hydroxyhydrocinnamate), tetrakis[methylene(3,5-di-t-butyl-4-hydroxyhydrocinnamate)]methane and triethylene glycol bis-3-(3-t-butyl-4-hydroxy-5-methylphenyl) propionate are particularly preferred.

Examples of amine stabilizers include N-phenyl-N'-isopropyl-p-phenylenediamine, N,N'-diphenyl-p-phenylenediamine, 4,4'-bis(4-4,4'-bis(4-$\alpha,\alpha$-dimethylbenzyl)diphenylamine, condensate of diphenylamine with acetone, N-phenylnaphthylamine and N,N'-di-$\beta$-naphthylphenylenediamine.

Examples of phosphorus stabilizers include phosphonite compounds represented by the following general formula (2):

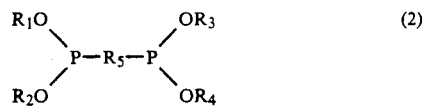

wherein $R_1$, $R_2$, $R_3$ and $R_4$ may be the same or different from each other and are each a $C_1 \sim _{25}$ alkyl, substituted alkyl, aryl or substituted aryl group. Particular examples thereof include methyl, ethyl, butyl, octyl, decyl, lauryl, tridecyl, stearyl, phenyl and alkyl- and/or alkoxy-substituted phenyl group; $R_5$ is a $C_4 \sim _{33}$ alkylene, substituted alkylene, arylene or substituted arylene group and particular examples thereof include butylene, octylene, phenylene, naphthylene and diphenylene groups and groups represented by the general formula:

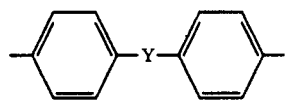

(wherein Y is an oxy, sulfonyl, carbonyl, methylene, ethylene, butylidene, isopropylene or diazo group). Particularly, tetrakis(2,4-di-t-butylphenyl) 4,4'-diphenylenephosphonite is preferred.

The stabilizer is used in an amount of 0 to 5% by weight, preferably between 0.1 to 3% by weight based on the total weight of the composition.

Flame retardants that may optionally be used include halogenated compounds such as brominated polycarbonate, brominated epoxy compounds, brominated diphenyl and brominated diphenyl ether. Auxiliary flame retardants include antimony compounds; such as antimony trioxide and antimony halide; metal compounds such as zinc or bismuth compounds; magnesium hydroxide and clay type silicates, such as asbestos.

The inorganic filler materials include ordinary inorganic fibers such as glass fiber, carbon fiber, ceramic fiber, boron fiber, potassium titanate fiber and asbestos; powdery, granular or flaky inorganic materials such as calcium carbonate, highly dispersible silicate, alumina, aluminum hydroxide, talc, clay, mica, glass flake, glass powder, glass bead, quartz powder, quartz sand, wollastonite, carbon black, barium sulfate, plaster of Paris, silicon carbide, alumina, boron nitride and silicon nitride, and whiskers. These inorganic fillers may be used alone or as a mixture of two or more the same.

The polyester resin compositions of the present invention are superior to conventional polyester resins in terms of their heat resistance, electrical and mechanical properties and the like, and are therefore useful as industrial materials. Particularly, the compositions of the present invention exhibit significantly reduced deterioration of physical properties even after exposure to thermal history conditions as compared with conventional resin compositions. More specifically, the resin compositions of the present invention exhibit the following beneficial effects:

(1) The composition exhibits reduced deterioration of physical properties, particularly flexibility after thermal history conditions so that the resin compositions are useful as materials to make devices or components to be used around a heat source (e.g., an engine or a heating element of an electrical appliance).

(2) Improved flexing properties are exhibited while the compositions' excellent mechanical and electrical properties are maintained. Therefore, the resin compositions are useful as coating materials for electrical wires to be used in rockets, airplanes or automobiles, electrical appliances, computer or information-related machines.

EXAMPLES

The present invention will be described below by reference to the following nonlimiting Examples.

PREPARATION OF POLYESTER COPOLYMER (A)

Preparation Example 1

100 parts by weight of dimethyl terephthalate (DMT), 90 parts by weight of 1,4-butanediol (BD) and 0.0026 part by weight of trimethyl trimesate were fed into a reactor fitted with a stirrer, a nitrogen inlet tube or an outlet for distillate, followed by the addition of a predetermined amount of a catalyst. The contents were stirred in a stream of nitrogen at 180° C. for 30 minutes and distilled to remove generated methanol. After stopping the introduction of nitrogen, the reactor was gradually evacuated while gradually raising the temperature of the contents. Finally, the contents were kept at 240° C. in a vacuum of 0.1 mmHg for 2.5 hours to complete the polymerization.

The obtained branched polymer (A-1) had an intrinsic viscosity of 0.92 (under the conditions of the measurement which will be described below).

Preparation Example 2

The same procedure as that described in Preparation Example 1 was repeated except that the amount of the trimethyl trimesate used as the component (c) was 0.026 part by weight. Thus, a branched polymer (A-2) having an intrinsic viscosity of 1.19 was obtained.

Preparation Example 3

The same procedure as that of Preparation Example 1 was repeated except that 0.0026 part by weight of trimethyl trimellitate was used as the component (c) instead of the trimethyl trimesate to obtain a branched polymer (A-3) having an intrinsic viscosity of 0.99.

Preparation Example 4

The same procedure as that of Preparation Example 3 was repeated except that the amount of the trimethyl trimellitate used was 0.026 part by weight to obtain a branched polymer (A-4) having an intrinsic viscosity of 1.05.

Preparation Example 5

100 parts by weight of DMT, 85 parts by weight of BD, 17.6 parts by weight of an adduct of tetrabromobisphenol A with 2 mol. of ethylene oxide and 0.026 part by weight of trimethyl trimellitate were copolymerized under the same conditions as those of Preparation Example 1. Thus a brominated branched polymer (A-5) having an intrinsic viscosity of 0.89 was obtained.

Comparative Preparation Example 1

The same procedure as that described in Preparation Example 1 was repeated except that no branch-forming compound (c) such as trimethyl trimesate was used. The obtained polybutylene terephthalate polymer (PBT) was unbranched and had an intrinsic viscosity of 0.88.

Example 1

1,3-Phenylenebisoxazoline (mPBO) was added to the polymer (A-1) prepared in Preparation Example 1 in an amount of 0.5% by weight based on the polymer. The obtained mixture was melt-kneaded and pelletized with an extruder.

The obtained pellets were examined for intrinsic viscosity according to an ordinary method by the use of o-chlorophenol as a solvent at 35° C. Separately, the pellets were injection-molded into a test piece by conventional techniques and the physical properties of the test piece were evaluated. In this regard, the tensile strength and elongation (%) were determined according to ASTM D 638. The impact test was carried out according to ASTM D 256. The long-term heat resistance was evaluated by storing a sample piece for tensile test in a thermostatic chamber of 120° C. for 500 hours and determining the strength, elongation and impact resistance of the resulting sample piece in s similar manner to that described above.

Examples 2 to 9

The polymers (A-1) to (A-5) prepared in Preparation Examples 1 to 5 were each melt-kneaded together with 1,3-phenylenebis(2-oxazoline) (mPBO) or 1,4-phenylenebis(2-oxazoline) (pPBO) in a ratio given in Table 1. The obtained composition was pelletized and evaluated in a similar manner to that described in Example 1. The results are shown in Table 1.

Comparative Example 1

The unbranched polymer (PBT) prepared in Comparative Preparation Example 1 was melt-kneaded together with 1% by weight of mPBO and pelletized with an extruder. The obtained pellets were evaluated in a similar manner to that described in Example 1. The results are shown in Table 1.

Comparative Examples 2 to 7

The polymers prepared in Preparation Examples 1 to 5 and Comparative Preparation Example 1 were each melt-extruded into pellets without adding any bisoxazoline compound as the component (B). The pellets thus prepared were evaluated in a similar manner to that described in Example 1. The results are shown in Table 1.

TABLE 1

| | Example No. | | | | | | | | |
|---|---|---|---|---|---|---|---|---|---|
| | 1 | 2 | 3 | 4 | 5 | 6 | 7 | 8 | 9 |
| Base polymer | A-1 | A-1 | A-1 | A-1 | A-2 | A-2 | A-3 | A-4 | A-5 |
| Intrinsic viscosity of base polymer | 0.92 | 0.92 | 0.92 | 0.92 | 1.19 | 1.19 | 0.99 | 1.05 | 0.89 |
| Bisoxazoline | mPBO | mPBO | mPBO | pPBO | mPBO | pPBO | mPBO | mPBO | mPBO |
| (% by weight) | (0.5) | (1.0) | (3.0) | (1.0) | (1.0) | (1.0) | (1.0) | (1.0) | (1.0) |
| Intrisic viscosity after addition of bisoxazoline | 0.95 | 0.97 | 0.97 | 0.97 | 1.22 | 1.23 | 1.02 | 1.07 | 0.94 |
| Tensile strength (kg/cm$^2$) | 578 | 590 | 572 | 586 | 618 | 604 | 508 | 606 | 559 |
| Tensile elongation (%) | >300 (not broken) | >300 (not broken) | >300 (not broken) | >300 (not broken) | >300 (not broken) | >300 (not broken) | >300 (not broken) | >300 (not broken) | >300 (not broken) |
| Izod impact strength (notched, notched side) | 3.5 | 3.6 | 3.5 | 3.6 | 3.7 | 3.6 | 3.5 | 3.6 | 3.4 |
| After 500 hours at 120° C. | | | | | | | | | |
| Tensile strength (kg/cm$^2$) | 588 | 596 | 586 | 595 | 622 | 610 | 585 | 580 | 581 |
| Tensile elongation (%) | 280 | >300 (not broken) | 290 | >300 (not broken) | >300 (not broken) | >300 (not broken) | >300 (not broken) | >300 (not broken) | >300 (not broken) |
| Izod impact strength (notched, notched side) | 3.6 | 3.5 | 3.4 | 3.5 | 3.4 | 3.5 | 3.5 | 3.4 | 3.4 |

| | Comparative Example No. | | | | | | |
|---|---|---|---|---|---|---|---|
| | 1 | 2 | 3 | 4 | 5 | 6 | 7 |

TABLE 1-continued

| Base polymer | PBT | A-1 | A-2 | A-3 | A-4 | A-5 | PBT |
|---|---|---|---|---|---|---|---|
| Intrinsic viscosity of base polymer | 0.88 | 0.92 | 1.19 | 0.99 | 1.05 | 0.89 | 0.88 |
| Bisoxazoline (% by weight) | mPBO (1.0) | — | — | — | — | — | — |
| Intrinsic viscosity after addition of bisoxazoline | 0.95 | — | — | — | — | — | — |
| Tensile strength (kg/cm$^2$) | 525 | 588 | 603 | 576 | 565 | 550 | 570 |
| Tensile elongation (%) | >300 (not broken) | >300 (not broken) | >300 (not broken) | >300 (not broken) | >300 (not broken) | >300 (not broken) | >300 (not broken) |
| Izod impact strength (notched, notched side) | 3.4 | 3.3 | 3.5 | 3.3 | 3.4 | 3.3 | 3.3 |
| After 500 hours at 120° C. | | | | | | | |
| Tensile strength (kg/cm$^2$) | 539 | 594 | 610 | 588 | 582 | 558 | 590 |
| Tensile elongation (%) | 210 | 135 | 120 | 148 | 135 | 89 | 55 |
| Izod impact strength (notched, notched side) | 1.6 | 1.4 | 1.5 | 1.4 | 1.4 | 1.3 | 1.3 |

DETAILED DESCRIPTION OF THE PREFERRED EXEMPLARY EMBODIMENTS

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A moldable heat-resistant polyester resin composition which retains its flexibility when subjected to cyclic thermal conditions, said composition comprising:
   (A) a branched polyester copolymer which is the polycondensation reaction product of (a) an aromatic dicarboxylic acid or an ester-forming derivative thereof, (b) an aliphatic glycol, and (c) between 0.001 to 1.0 mole % based upon component (a), of a branch-forming compound, and
   (B) between 0.1 to 10% by weight, based on the total weight of the composition, of a bisoxazoline compound which is one selected from m-phenylenebisoxazoline or p-phenylenebisoxazoline.

2. A resin composition as in claim 1, wherein said aliphatic glycol is at least one compound selected from C2 to C8 low-molecular weight glycols.

3. A resin composition as in claim 2, wherein said C2 to C8 low-molecular weight glycol is at least one glycol selected from ethylene glycol, 1,4-butylene glycol and 1,4-butene glycol.

4. A resin composition as in claim 1, wherein said branch-forming compound is a compound having at least three functional groups, in sum total, in its molecule, wherein said functional groups are selected from carboxyl and hydroxyl groups, and ester-forming derivative groups thereof.

5. A resin composition as in claim 4, wherein said branch-forming compound is at least one compound selected from trimesic acid, trimellitic acid, and pyromellitic acid, and ester-forming derivatives thereof.

* * * * *

UNITED STATES PATENT AND TRADEMARK OFFICE
CERTIFICATE OF CORRECTION

PATENT NO. : 5,039,760

DATED : August 13, 1991

INVENTOR(S) : NAKANE et al

It is certified that error appears in the above-identified patent and that said Letters Patent is hereby corrected as shown below:

Column 2, line 63, change "etylene" to --ethylene--;
line 67, change "adduct" to --adducts--.

Signed and Sealed this

Twenty-third Day of February, 1993

Attest:

STEPHEN G. KUNIN

*Attesting Officer*     Acting Commissioner of Patents and Trademarks